(12) United States Patent
Holt

(10) Patent No.: US 7,374,388 B2
(45) Date of Patent: May 20, 2008

(54) PORTABLE GAME HOIST WITH FOLDING BOOM

(76) Inventor: Charles W. Holt, 726 Co. Rd. 41, Altoona, AL (US) 35952

( * ) Notice: Subject to any disclaimer, the term of this patent is extended or adjusted under 35 U.S.C. 154(b) by 185 days.

(21) Appl. No.: 11/256,716

(22) Filed: Oct. 24, 2005

(65) Prior Publication Data

US 2007/0092362 A1 Apr. 26, 2007

(51) Int. Cl.
*B60P 9/00* (2006.01)
*B66C 23/44* (2006.01)
*A22B 1/00* (2006.01)

(52) U.S. Cl. .................... 414/462; 212/180; 452/189

(58) Field of Classification Search ............... 414/462, 414/539–543; 452/187, 189, 192; 212/180, 212/294, 299; 294/68.3, 81.4, 81.1; 254/325
See application file for complete search history.

(56) References Cited

U.S. PATENT DOCUMENTS

| | | | | |
|---|---|---|---|---|
| 2,809,069 | A | * | 10/1957 | Neel .......................... 452/192 |
| 2,890,078 | A | * | 6/1959 | Mincey ...................... 452/189 |
| 4,270,628 | A | * | 6/1981 | Anderson ................... 212/261 |
| 4,806,063 | A | * | 2/1989 | York .......................... 414/462 |
| 5,540,537 | A | | 7/1996 | Welch ........................ 414/462 |
| 5,788,095 | A | * | 8/1998 | Watson ...................... 212/180 |
| 5,791,858 | A | * | 8/1998 | Sasser ........................ 414/462 |
| 6,045,442 | A | * | 4/2000 | Bounds ...................... 452/187 |
| 6,089,431 | A | * | 7/2000 | Heyworth ................... 224/521 |
| 6,095,349 | A | * | 8/2000 | O'Meara .................... 212/180 |
| 6,109,855 | A | | 8/2000 | Vela-Cuellar ............... 414/462 |
| 6,152,675 | A | | 11/2000 | Compton .................... 414/543 |
| 6,189,866 | B1 | | 2/2001 | Harkins et al. ............. 254/332 |
| 6,250,483 | B1 | * | 6/2001 | Frommer .................... 212/180 |
| 6,578,722 | B2 | | 6/2003 | Perkins et al. ............. 212/180 |
| 6,705,821 | B2 | | 3/2004 | Philipps et al. ............ 414/462 |
| 6,981,834 | B1 | * | 1/2006 | Henry ........................ 414/462 |
| 2002/0168258 | A1 | * | 11/2002 | Philipps et al. ............ 414/462 |

* cited by examiner

*Primary Examiner*—Saul J. Rodriguez
*Assistant Examiner*—Gregory W Adams
(74) *Attorney, Agent, or Firm*—Charles D. Gunter, Jr.

(57) ABSTRACT

The game hoist apparatus is attachable to a tow hitch of a pickup truck or similar vehicle. The game hoist can be taken to the site in the bed of the truck and speedily installed in the tow hitch for hanging, cleaning and butchering large game, such as deer. The hoist includes a folding tubular boom of square cross-section, and having a winch, pulleys and a spreader bar for supporting the game animal. A stabilizer fixture on the end of the boom engages the spreader bar to prevent the game from twisting. The boom is made up of two sections which are locked in place at a swivel bracket by removable pins for operation, and unlocked by removing the pins for folding the unit for storage or transit. The boom lower end is supported from an attachment bar which is inserted into a tow hitch and locked in place with the hitch pin.

8 Claims, 4 Drawing Sheets

PORTABLE GAME HOIST WITH FOLDING BOOM

BACKGROUND OF THE INVENTION

A. Cross Reference To Related Applications

The present application claims priority from earlier filed provisional application, Ser. No. 60/822,427, filed 10/27/2004, entitled "Folding Boom Lift Crane", by the same inventor.

B. Field of the Invention

The present invention relates to vehicle-mounted game hoists for lifting and skinning game. More specifically, the invention is a collapsible game hanger which prevents the game from twisting, which is installable on the trailer hitch of a pickup truck, and enables an open tailgate while utilizing the game hanger apparatus C. Description of the Prior Art There are a number of prior art game hanger devices of various configurations which are available in the industry. Some of these devices are mounted from a tree or other external support. Other of the prior art devices are intended to be mounted on the trailer hitch of a pickup truck or similar vehicle to facilitate transport of the hanger device to the vicinity of the downed game.

For example, U.S. Pat. No. 5,791,858, issued on Aug. 11, 1998 to Kenneth W. Sasser, describes a vehicle mounted game skinning device that is separable and connected to a receiver hitch assembly via a pin. The apparatus includes a winch and pulley assembly, an adjustable boom assembly and a gambrel for hoisting an animal. Despite its advantages, the gambrel device which is utilized can readily twist when the game is hoisted and the overall device does not allow room for the tailgate of the truck to be lowered.

U.S. Pat. No. 4,806,063, issued on Feb. 21, 1989 to W. Clifton York, describes a portable wild game hoist that is separable for storage and comprises a winch and pulley assembly with a gambrel that attaches to the ball hitch. The assembly is stabilized by straps that attach to the vehicle fender wells and a torsion bar on the boom which bears against the closed tailgate or a plate which rests on the hitch ball. Once again, the device features a twistable gambrel and anchoring elements which do not permit the lowering of the gate.

U.S. Pat. No. 5,540,537, issued on Jul. 30, 1996 to Wilmer M. Welch, describes a portable hoist which mounts to a trailer hitch drawbar receiver of a pickup truck that can use either a block and tackle or a pulley to support the winch cable. The device is located in close proximity to the tailgate, which must be closed, and the swinging terminal hook of the block and tackle or pulley system would allow the game to twist while being dressed.

The above references are not intended to be an all inclusive list of the relevant prior art but are believed to be representative of the state of the art. Despite the advantages offered by these improved designs, certain disadvantages continued to exist.

There is a need for a game hoist apparatus which can be readily attached and supported from the trailer hitch of a pickup truck or similar vehicle which will allow the tailgate to be opened in use, which prevents the game from twisting during skinning, and which can subsequently be quickly and easily detached from the trailer hitch and folded for transport or storage.

SUMMARY OF THE INVENTION

Accordingly, it is an object of the invention to provide a game hoist and hanger apparatus for attachment to a pickup truck's trailer hitch.

It is another object of the invention to provide a game hoist apparatus that is foldable and readily removable from the truck for easily installation.

It is a further object of the invention to provide a game hanger apparatus which has a stable game spreader bar that eliminates twisting of the game.

Still another object of the invention is to provide a game hoist apparatus having a foldable boom and a winch which facilitates raising and lowering a game spreader bar at the end of the boom.

It is an object of the invention to provide improved elements and arrangements thereof in an apparatus for the purposes described which is inexpensive, dependable and fully effective in accomplishing its intended purposes.

There is thus provided a foldable game hoist and hanger apparatus for attachment to the trailer or tow hitch of a pickup truck or similar vehicle. The folded game hanger can be taken to the hunting site in the bed of the truck and speedily installed in the tow hitch for hanging, cleaning and butchering large game, such as whitetail deer. The game hoist includes a tubular attachment bar having an inner end and an outer end, the inner end being sized to be received within a mating opening provided in a trailer hitch of a pickup truck so that the attachment bar forms a generally horizontal plane with respect to the opening. A two part, tubular boom section having an upper end and having an oppositely arranged lower end is fixedly connected to the outer end of the attachment bar. The boom section forms an included angle with respect to the horizontal plane of the attachment bar which angle is determined to provide an adequate opening space for a tailgate of the pickup truck in use and with the boom section in place on the trailer hitch.

The boom section also has a centrally located swivel bracket which pivotally connects the two parts of the boom section and which allows the boom section to be positionable between an extended position for supporting game and a collapsed position for transport and storage. A support arm is fixed to and extends outwardly from the upper end of the boom section in a plane generally parallel to the plane of the attachment bar. A tubular stabilizer fixture has a joining end which removably connects the stabilizer fixture to the support arm and also has a depending horizontal stabilizer bar. A winch is attached to the boom section, the winch having a cable extending through one or more pulleys along the boom section and along the support arm. An outer extent of the cable is attached to a spreader bar for supporting a game animal in order to raise and lower the animal from the ground to facilitate dressing the animal. The stabilizer bar on the stabilizer fixture has a receiving channel for receiving at least a portion of the spreader bar once a game animal is hung from the spreader bar and the winch has been used to hoist the animal from the ground, engagement between the stablizer bar channel and the spreader bar serving to prevent the game animal from twisting in the air.

Preferably, the boom section lower end forms an included angle "α" with respect to a horizontal axis drawn in the horizontal plane of the tubular attachment bar which is greater than 90°. This allows adequate room between the boom and the tailgate of the truck to allow the tailgate to be fully opened, even with the boom in place on the trailer hitch. In the preferred embodiment of the invention, the tubular attachment bar and the tubular support bar both form oppositely arranged complimentary angles, "α" and "β", whereby the hoist is foldable upon itself by freeing the swivel bracket which connects the two parts of the boom section and moving the boom sections to the collapsed position.

The preferred stabilizer fixture includes an angle bracket with an end opening for engaging the support arm and an oppositely arranged lower extent which connects to the stabilizer bar in an approximate mid region thereof. The connection between the stabilizer bar and the angle bracket is a fixed connection, thereby preventing the stabilizer fixture from rotating relative to the boom sections. The angle bracket is held onto the support arm of the hoist by means of a removable pin which slides between locked and unlocked positions. The tubular spreader bar has at least one support chain and S-hook at either of opposite extents thereof for securing a game animal to the support bar.

Additional objects, features and advantages will be apparent in the written description which follows.

DETAILED DESCRIPTION OF THE INVENTION

Figure 1:
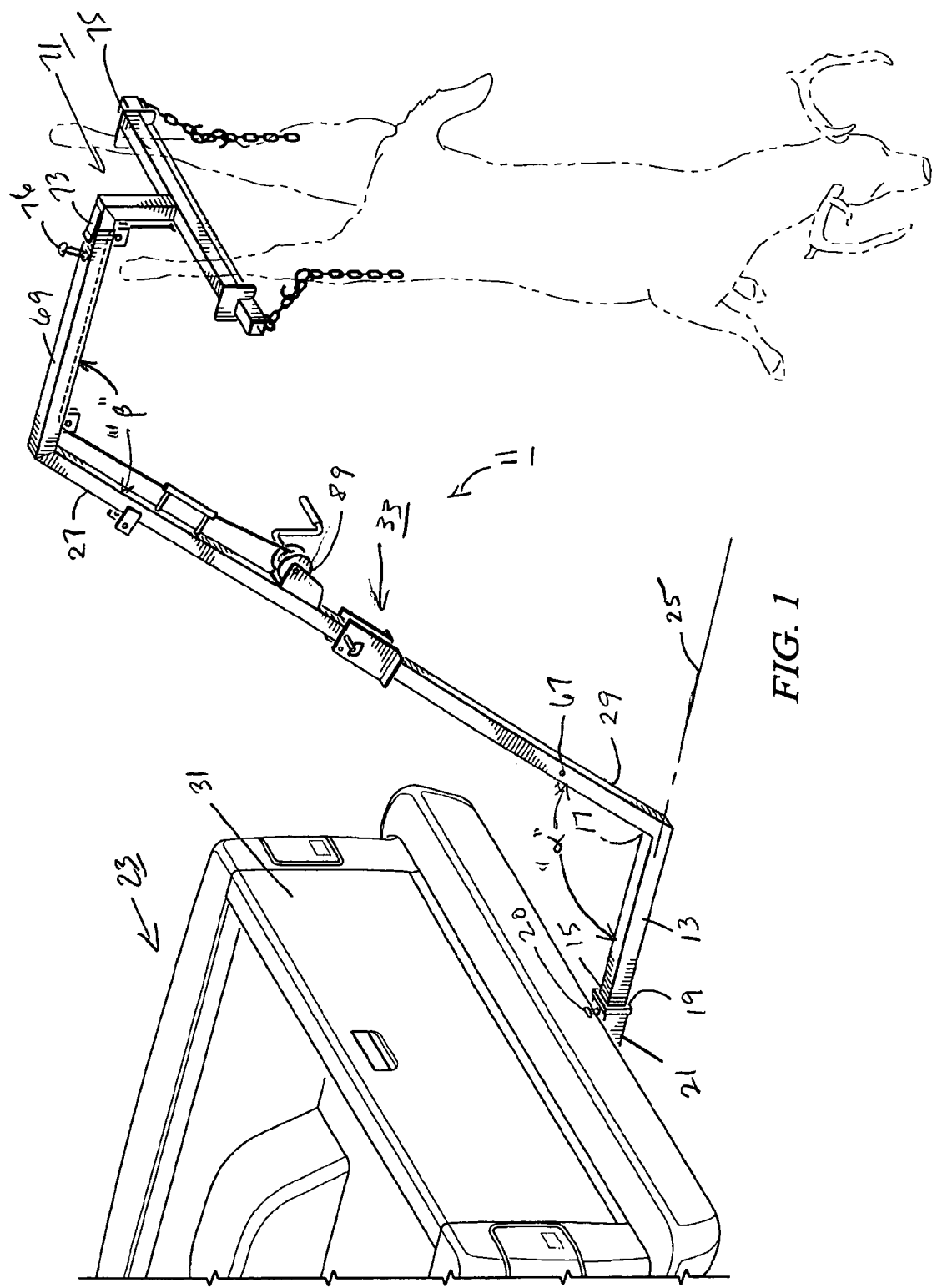
FIG. 1 is a perspective view of the game hoist of the invention in place on the trailer hitch of a pickup truck, showing a game animal being supported thereon, the animal being shown in phantom lines.

Turning now to FIG. 1, there is shown a foldable game hoist and hanging apparatus designated generally as 11. The principal components of the hoist are all formed of two inch square metal tubing and the assembled apparatus has the capability of supporting a load on the order of 400 lbs. The lower portion of the hoist apparatus includes a tubular attachment bar 13 which has an inner end 15 and an outer end 17. The inner end is sized to be received within a mating opening 19 of a conventional trailer hitch 21 of a pickup truck 23. For example, the hitch 21 could be a Reese Hitch™ manufactured by Reese International, 47774 Anchor Court West, Plymouth, Mich. 48170. As will be appreciated from FIG. 1, the tubular attachment bar 13 forms a generally horizontal plane with respect to the trailer hitch opening 19 and the imaginary axis illustrated as 25. A slidable pin 20 retains the attachment bar 13 within the hitch opening 19.

A two part, tubular boom section having an upper end 27 and an oppositely arranged lower end 29 is fixedly connected, as by welding, to the outer end 17 of the attachment bar 13. The lower boom section forms an included angle "α" with respect to the horizontal axis and plane 25 of the attachment bar 13 which angle is determined to provide an adequate opening space for the tailgate 31 of the of the pickup truck 23 in use and with the boom section in place on the trailer hitch. As will be appreciated from FIG. 1, the angle "α" is greater than 90°. Preferably the angle is in the range from about 110 to 130° with the most preferred angle being about 120°.

Figure 2:
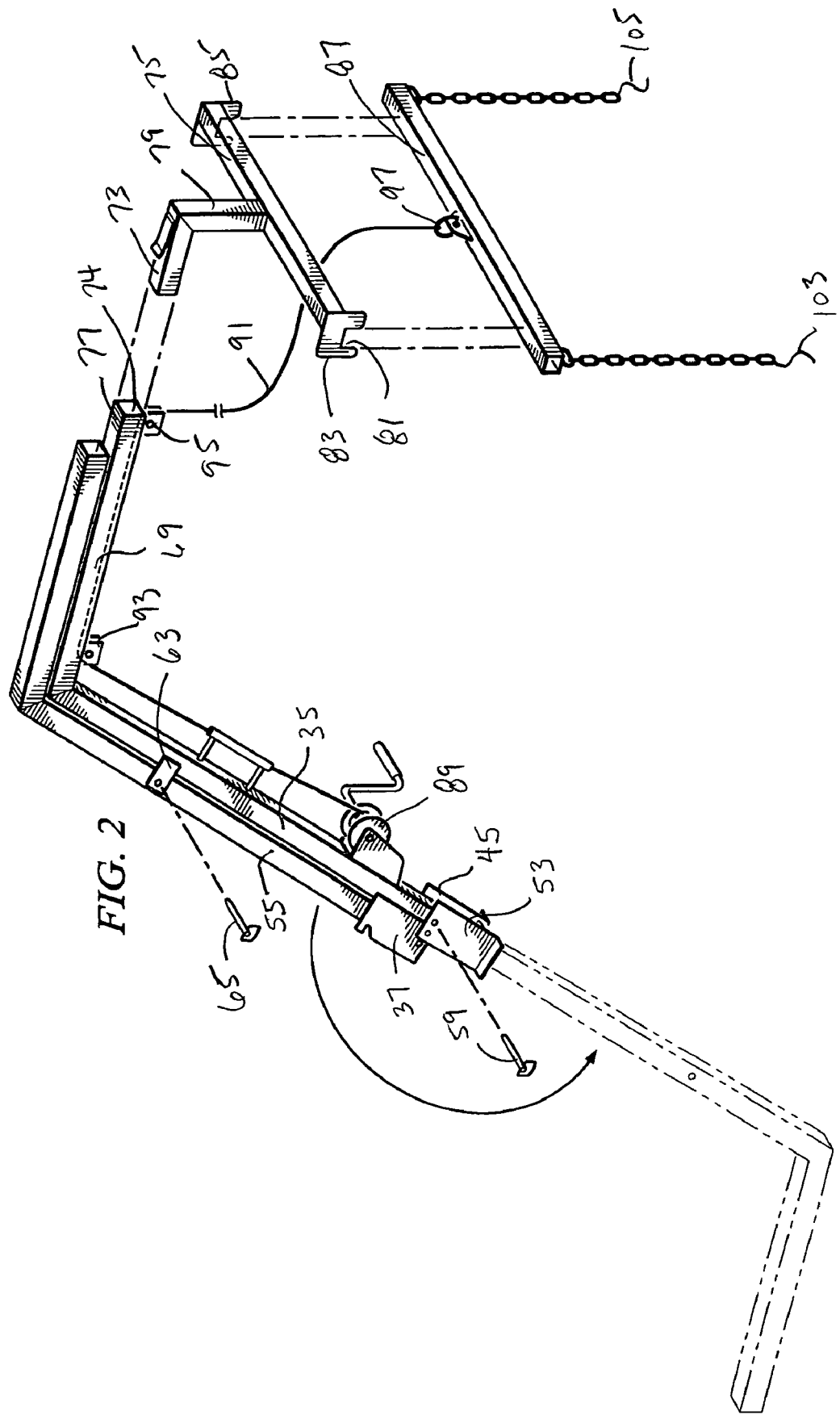
FIG. 2 is a view of the game hoist of FIG. 1 in the collapsed position showing the folded boom sections, the bottom boom section being illustrated in phantom lines to illustrate the extended position.
Figure 3:
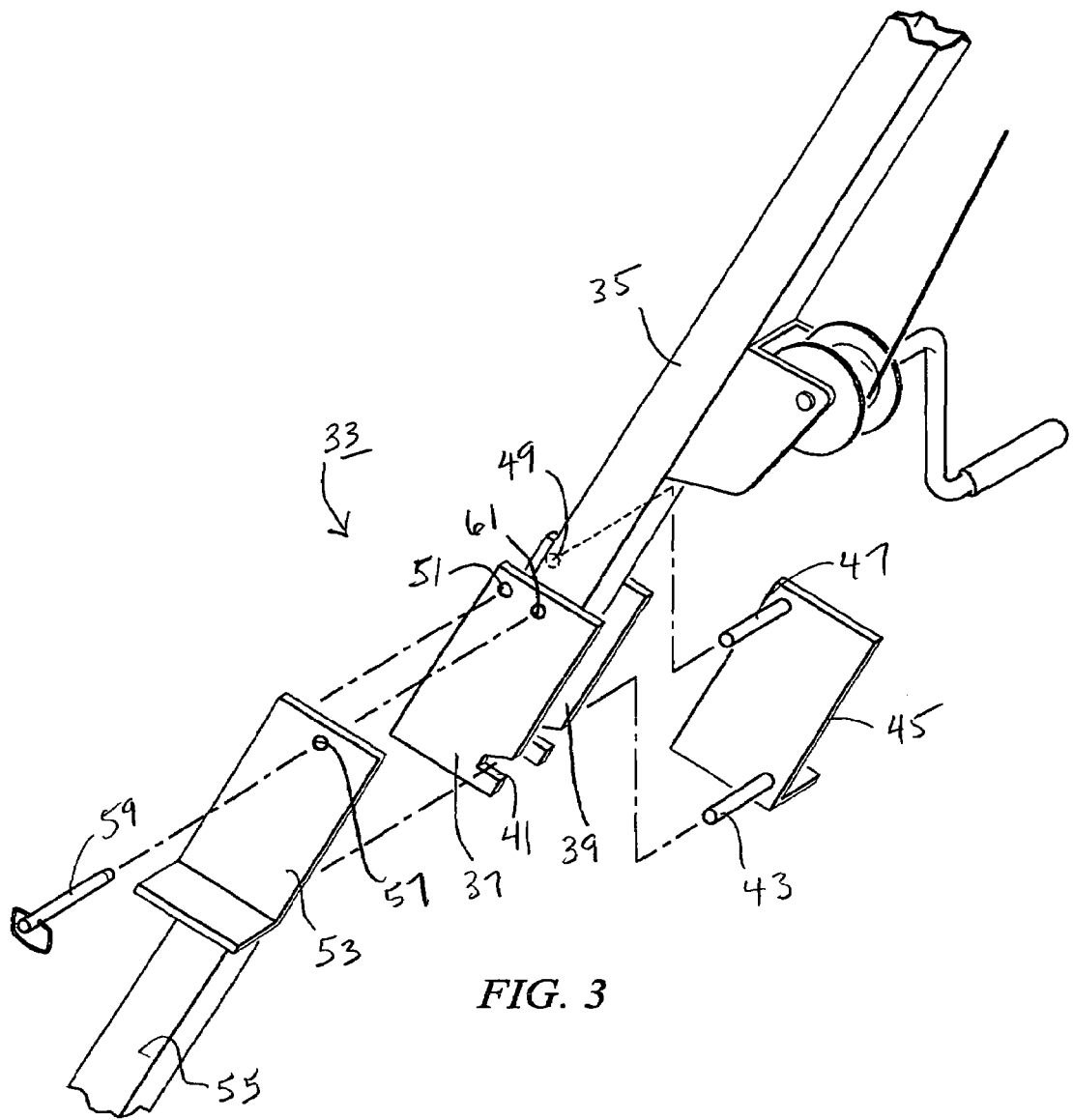
FIG. 3 is an isolated view of the swivel bracket which is used to pivotally connect the two boom sections of the device, the parts thereof being shown in exploded fashion for ease of illustration.

As will be appreciated from FIGS. 1-3, the upper and lower boom sections of the hoist are pivotally attached by means of a swivel bracket 33. The swivel bracket is shown in greater detail in isolated fashion in FIG. 3. As shown in FIG. 3, the upper boom section 35 carries a pair of oppositely arranged device plates 37,39 on either of two opposite sides thereof. The device plates 37,39 each have a lower aligned slot 41 for receiving a retaining pin 43 of a side plate 45. The side plate 45 also has an upper retaining pin 47 which is received within an opening 49 provided in the tubular boom section 35 and which passes through an aligned opening 51 in the device plate 37. A mating side plate 53 is attached to the lower boom section 55. The mating plate 53 has an opening 57 for receiving a sliding retainer pin 59 which passes through the opening 57 into a mating opening 61 provided in the device plate 37. With the pin 59 in place within the aligned 57, 61 and the retaining pin 43 residing in the slot 41, the boom sections 35, 55, are locked in an extended position, as shown in FIG. 1. By removing the retainer pin 59, the boom sections 34, 55 can be pivoted to the collapsed position illustrated in FIG. 2. As can also be seen in FIG. 2, the upper boom section 35 has a retainer bracket 63 which receives the lower boom section 55. A removable pin 65 is received within a mating opening 67 (FIG. 1) to maintain the hoist in the collapsed position.

Returning to FIG. 1, a support arm 69 is fixed to and extends outwardly from the upper end of the upper boom section in a plane generally parallel to the plane of the attachment bar 13. The support arm 69 forms an included angle "β" with respect to the upper boom section. The angle "β" is complimentary to that of angle "α", so that if a is 120°, then β is approximately 60°, whereby the hoist is foldable upon itself by freeing the swivel bracket which connects the two boom sections.

A tubular stabilizer fixture, designated generally as 71 is FIG. 1, has a joining end 73 which removably connects the stabilizer fixture to the support arm 69 and also has a depending horizontal stabilizer bar 75. With reference to FIG. 2, the joining end 73 can be conveniently be a section of the square tubing which is engaged within an end opening 74 for engaging the support arm 69 and which has an oppositely arranged lower extent 79 which forms an angle bracket and which connects to the stabilizer bar 75 in an approximate mid-region thereof. A sliding pin (76 in FIG. 1) can be used to retain the stabilizer fixture 71 on the support arm 69. The connection between the stabilizer bar 75 and the angle bracket is a fixed connection, thereby preventing the stabilizing fixture from rotating relative to the boom sections of the hoist. The stabilizer bar 75 on the stabilizer fixture 71 has a receiving channel 81 formed by the end brackets 83, 85 for receiving at least a portion of a spreader bar 87 once a game animal is hung from the spreader bar.

Figure 4:
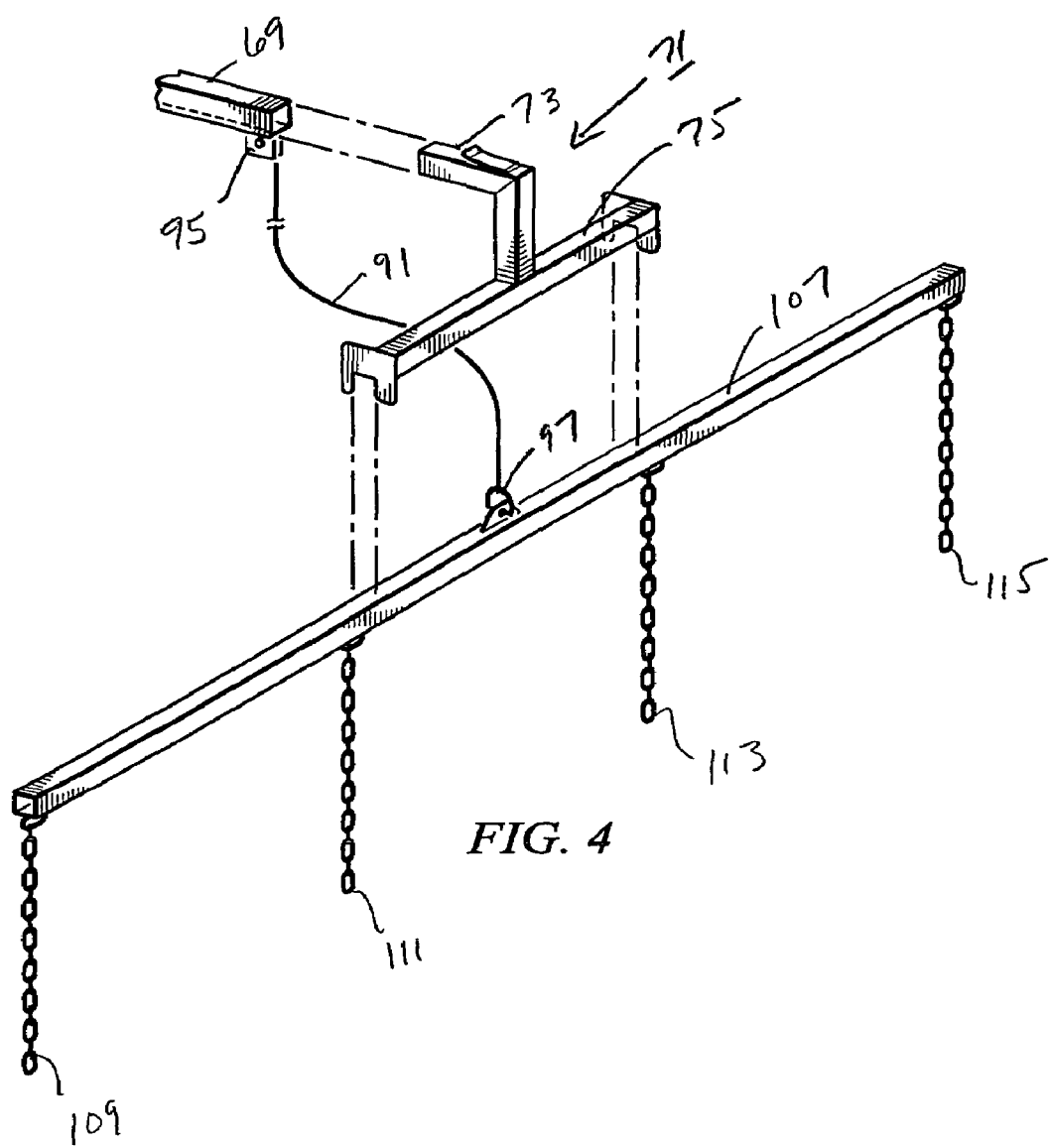
FIG. 4 is an isolated view of a portion of the support arm of the device showing the connection of the stabilizer fixture with its horizontal stabilizer bar and showing a double spreader bar which is engaged therewith by means of a cable.

A winch 89 (FIG. 2) has a spool which carries a cable 91 which extends through one or more pulleys 93, 95 along the upper boom section and along the support arm 69. An outer extent 97 (FIG. 2) of the cable is attached to the spreader bar 87 in the approximate mid-region thereof for supporting a game animal in order to raise and lower the animal from the ground to facilitate dressing the animal. The stabilzer bar 75 on the stabilizer fixture 71 engages the spreader bar 87 once a game animal is hung from the spreader bar by means of the chains 99, 101 and S-hooks 103, 105 to prevent the game animal from twisting in the air. FIG. 4 shows another embodiment of the spreader bar 107 which, in this case, has two positions for hanging game which are provided by the spaced hanger chains 109, 111, 113 and 115.

An invention has been provided with several advantages. For years, hunters have been forced to use ropes and trees or surrounding structures when attempting to process deer. The game hoist of the invention lifts loads of up to 400 lbs. and simultaneously stabilizes the kill so that a hunter can use both hands during the dressing operation. The hoist is easily mounted on the trailer hitch of a conventional pickup truck and is oriented at an angle which allows of the lowering of the tailgate for easy access to skinning utensils. Pin locks are used at the trailer hitch, the swivel bracket and at the stabilizer fixture for securing the components of the hoist in a safe manner. The two part boom can be easily folded for transporting storage. The heavy duty winch and cable which are mounted on the boom allow a hunter to raise a deer with minimal effort. When formed of two inch heavy duty square tubing, the overall weight of the device is approximately 61 lbs. The swivel hinge arrangement allows the boom sections to be folded so that the approximate length of the folded device is only 68 inches.

While the invention has been shown in several of its forms, it is not thus limited but is susceptible to various changes and modifications without departing from the spirit thereof.

I claim:

1. A foldable game hoist for attachment to a trailer hitch of a vehicle, the game hoist comprising:
   a tubular attachment bar having an inner end and an outer end, the inner end being sized to be received within a mating opening provided in a trailer hitch of the vehicle so that the attachment bar forms a generally horizontal plane with respect to the opening;
   a two part, tubular boom having an upper boom section and a lower boom section and an upper end and having an oppositely arranged lower end which is fixedly connected to the outer end of the attachment bar, the two part boom forming an included angle with respect to the horizontal plane of the attachment bar which angle is determined to provide an adequate opening space for a tailgate of the vehicle in use and with the boom in place on the trailer hitch;
   a centrally located swivel bracket assembly which pivotally connects the two parts of the boom and which allows the boom to be positionable between an extended position for supporting game and a collapsed position for transport, the swivel bracket assembly including a pair of oppositely arranged device plates on either of two opposing sides of the upper boom section, the device plates each having a lower aligned slot, the assembly further including a first side plate carrying an upper retaining pin which is received within an opening provided in the upper boom section and which passes through an aligned opening in one of the device plates and having a lower retaining pin which engages the lower aligned slots of the device plates when the boom sections are in the extended position, the assembly further including a mating side plate attached to the upper boom section, the mating plate having an opening for receiving a sliding retainer pin which passes through an opening in the opposite device plate, whereby the upper and lower boom sections can be locked in the extended position;
   a support arm which is fixed to and which extends outwardly from the upper end of the boom section in a plane generally parallel to the plane of the attachment bar;
   a tubular stabilizer fixture having a joining end which removably connects the stabilizer fixture to the support arm and having a depending horizontal stabilizer bar;
   a winch attached to the boom section, the winch having a cable extending through at least one pulley on the support arm;
   wherein an outer extent of the cable is attached to a spreader bar for supporting a game animal in order to raise and lower the animal from the ground to facilitate dressing the animal;
   wherein the stabilizer bar on the stabilizer fixture has a C-shaped receiving channel for receiving at least a portion of the spreader bar once a game animal is hung from the spreader bar and the winch has been used to hoist the animal from the ground, engagement between the stabilizer bar channel and the spreader bar serving to prevent the game animal from twisting in the air; and
   wherein the tubular attachment bar and the support arm both form oppositely arranged included angles which are supplementary, whereby the hoist is foldable upon itself in a pivoting action to form an L-shaped profile by freeing the swivel bracket assembly which connects the two parts of the boom and moving the boom sections to the collapsed position, the tubular attachment bar and the support arm contacting and resting upon one another in the collapsed position.

2. The game hoist of claim 1, wherein the included angle which the boom section lower end forms with respect to a horizontal axis drawn in the horizontal plane of the tubular attachment bar is greater than 90°.

3. The game hoist of claim 2, wherein the angle is in the range from about 110 to 130°.

4. The game hoist of claim 3, wherein the angle is approximately 12°.

5. The game hoist of claim 1, wherein the stabilizer fixture includes an end bracket which engages the support arm and an oppositely arranged lower extent which connects to the stabilizer bar in an approximate mid region thereof, the connection between the stabilizer bar and the end bracket being a fixed connection, thereby preventing the stabilizer fixture from rotating relative to the boom sections.

6. The game hoist of claim 5, wherein the end bracket is held onto the support arm of the hoist by means of a removable pin which slides between locked and unlocked positions.

7. The game hoist of claim 1, wherein the spreader bar has at least one support chain and S-hook at either of opposite extents thereof for securing a game animal to the support bar.

8. A foldable game hoist for attachment to a trailer hitch of a vehicle, the game hoist comprising:
   a tubular attachment bar having an inner end and an outer end, the inner end being sized to be received within a mating opening provided in a trailer hitch of the vehicle so that the attachment bar forms a generally horizontal plane with respect to the opening;
   a two part, tubular boom having an upper boom section and a lower boom section and an upper end and having an oppositely arranged lower end which is fixedly connected to the outer end of the attachment bar, the two part tubular boom forming an included angle with respect to the horizontal plane of the attachment bar which angle is determined to provide an adequate opening space for a tailgate of the vehicle in use and with the boom in place on the trailer hitch;

a centrally located swivel bracket assembly which pivotally connects the two parts of the boom and which allows the boom sections to pivot in a common plane and thereby be positionable between an extended position for supporting game and a collapsed position for transport, the swivel bracket assembly including a pair of oppositely arranged device plates on either of two opposing sides of the upper boom section, the device plates each having a lower aligned slot, the assembly further including a first side plate carrying an upper retaining pin which is received within an opening provided in the upper boom section and which passes through an aligned opening in one of the device plates and having a lower retaining pin which engages the lower aligned slots of the device plates when the boom sections are in the extended position, the assembly further including a mating side plate attached to the upper boom section, the mating plate having an opening for receiving a sliding retainer pin which passes through an opening in the opposite device plate, whereby the upper and lower boom sections can be locked in the extended position;

a support arm which is fixed to and which extends outwardly from the upper end of the boom in a plane generally parallel to the plane of the attachment bar;

a tubular stabilizer fixture having a joining end which removably connects the stabilizer fixture to the support arm and having a depending horizontal stabilizer bar;

a winch attached to the upper boom section, the winch having a cable extending through at least one pulley on the support arm;

wherein an outer extent of the cable is attached to a tubular spreader bar for supporting a game animal in order to raise and lower the animal from the ground to facilitate dressing the animal, the tubular spreader bar having a polygonal cross section;

wherein the stabilizer bar on the stabilizer fixture has a C-shaped receiving channel for receiving at least a portion of the tubular spreader bar once a game animal is hung from the spreader bar and the winch has been used to hoist the animal from the ground, engagement between the stabilizer bar channel and the spreader bar serving to prevent the game animal from twisting in the air; and wherein the tubular attachment bar and the support arm both form oppositely arranged included angles which are supplementary, whereby the hoist is foldable upon itself to form an L-shaped profile in a pivoting action by freeing the swivel bracket which connects the two parts of the boom and moving the boom sections to the collapsed position, the tubular attachment bar and the support arm contacting and resting upon one another in the collapsed position while the upper and lower boom sections remain connected to one another at a pivot point.

* * * * *